US007863054B2

(12) United States Patent
Takagi

(10) Patent No.: US 7,863,054 B2
(45) Date of Patent: Jan. 4, 2011

(54) MICROFLUIDIC SYSTEM, SAMPLE ANALYSIS DEVICE, AND TARGET SUBSTANCE DETECTION/MEASUREMENT METHOD

(75) Inventor: Fumio Takagi, Chino (JP)

(73) Assignee: Seiko Epson Corporation (JP)

( * ) Notice: Subject to any disclaimer, the term of this patent is extended or adjusted under 35 U.S.C. 154(b) by 945 days.

(21) Appl. No.: 11/604,540

(22) Filed: Nov. 27, 2006

(65) Prior Publication Data

US 2007/0120903 A1 May 31, 2007

(30) Foreign Application Priority Data

Nov. 28, 2005 (JP) ............................ 2005-342563

(51) Int. Cl.
*G01N 1/10* (2006.01)

(52) U.S. Cl. ...................................... 436/180; 422/100

(58) Field of Classification Search ................ 422/100; 436/180
See application file for complete search history.

(56) References Cited

U.S. PATENT DOCUMENTS

| | | | | |
|---|---|---|---|---|
| 5,890,745 | A | 4/1999 | Kovacs | |
| 7,303,727 | B1 * | 12/2007 | Dubrow et al. | 422/100 |
| 7,438,860 | B2 | 10/2008 | Takagi et al. | |
| 7,504,070 | B2 | 3/2009 | Bessho et al. | |
| 7,682,571 | B2 * | 3/2010 | Kim et al. | 422/102 |
| 2002/0009392 | A1 | 1/2002 | Wolk et al. | |
| 2003/0012697 | A1 | 1/2003 | Hahn et al. | |
| 2003/0190265 | A1 * | 10/2003 | Anazawa et al. | 422/103 |
| 2004/0031686 | A1 | 2/2004 | Foret et al. | |
| 2004/0115094 | A1 | 6/2004 | Gumbrecht et al. | |
| 2006/0094119 | A1 * | 5/2006 | Ismagilov et al. | 436/53 |
| 2006/0171852 | A1 * | 8/2006 | Renzi | 422/100 |
| 2007/0287147 | A1 | 12/2007 | Nagamune et al. | |

FOREIGN PATENT DOCUMENTS

| | | | |
|---|---|---|---|
| DE | 103 08 050 | A1 | 9/2004 |
| EP | 0 488 947 | A1 | 11/1991 |
| EP | 1 424 559 | A1 | 6/2004 |
| JP | 05-306683 | | 11/1993 |
| JP | 2005-010144 | | 11/1993 |
| JP | 2004-500578 | | 1/2004 |
| JP | 2004-160904 | | 6/2004 |
| JP | 2004-532395 | | 10/2004 |
| JP | 2005-156526 | | 6/2005 |
| JP | 2005-227250 | | 8/2005 |
| WO | WO 98/25065 | | 6/1998 |
| WO | WO 98/33001 | | 7/1998 |
| WO | WO 01/38865 | | 5/2001 |
| WO | WO 01/53794 | A1 | 7/2001 |
| WO | WO 03/060056 | A2 | 7/2003 |

(Continued)

*Primary Examiner*—Brian R Gordon
(74) *Attorney, Agent, or Firm*—Harness, Dickey & Pierce, P.L.C.

(57) ABSTRACT

A microfluidic system includes a plate-shaped microfluidic chip having a flow path, a liquid introduction tube for supplying liquid to the flow path, the liquid introduction tube having an end communicating with an end of the flow path and its other end that can be soaked in the liquid that is to be supplied to the flow path, and a liquid discharge head communicating with the other end of the flow path for discharging liquid that has passed through the flow path.

4 Claims, 8 Drawing Sheets

FOREIGN PATENT DOCUMENTS

| | | | |
|---|---|---|---|
| WO | WO 03/072251 | A2 | 7/2003 |
| WO | WO 2004/083823 | | 9/2004 |
| WO | WO 2004/086055 | | 10/2004 |
| WO | WO 2005/005043 | | 1/2005 |
| WO | WO 2005-093420 | | 10/2005 |

* cited by examiner

MICROFLUIDIC SYSTEM, SAMPLE ANALYSIS DEVICE, AND TARGET SUBSTANCE DETECTION/MEASUREMENT METHOD

BACKGROUND

1. Technical Field

The present invention relates to a microfluidic system, sample analysis device, and target substance detection/measurement method used mainly for detecting reaction of a biological sample.

2. Related Art

A method for performing chemical analysis, chemical synthesis, or biotechnology-related analysis by using a microfluidic chip composed of a glass plate having a fine flow path on its surface has been attracting attention. In a microfluidic chip, also called"micro total analytical system" (micro TAS), or "Lab-on-a chip," etc., the required amount for a sample is smaller, the reaction time shorter, and the amount of waste smaller than in conventional devices. Because of those advantages, application in various fields, such as diagnosis, onsite analysis of environments or foods, is expected.

Analysis using a microfluidic chip needs a means for stably introducing a sample solution to a fine flow path while controlling the injection speed to make samples react by mixing sample solutions in the fine flow path in the chip, and detect that reaction, and a micropump, or a syringe pump, or something similar is used as that means.

JP-A-2005-227250 discloses a method for stopping and performing solution transfer by connecting a pump and a fine flow path in a microchip.

In the method disclosed in JP-A-2005-227250, the microchip, valve, and solution transfer pump are connected via capillaries, as shown in FIG. 1. Their connecting parts have to be joined to each other with a silicone tube or the like, but sometimes bubbles enter from the joint and prevent the flow of the sample solution. Moreover, because the volume in the capillaries is dead volume, the reaction time delays and the sample solution is wasted. Furthermore, the whole apparatus becomes large when capillaries are used for connection, and as a result, the advantage of the compact structure of the microfluidic system cannot be fully utilized.

SUMMARY

An advantage of some aspects of the invention is to provide a microfluidic system capable of stably introducing a sample solution to a fine flow path in a microfluidic chip while controlling the introducing speed, the microfluidic system being one in which bubbles cannot easily enter the flow path and the dead volume is small.

To achieve the above stated advantage, the present invention provides a microfluidic system including a plate-shaped microfluidic chip having a flow path, a liquid introduction tube for supplying liquid to the flow path, the liquid introduction tube having an end connected to one end of the flow path and its other end that can be soaked in the liquid that is to be supplied to the flow path, and a liquid discharge head connected to the other end of the flow path for discharging the liquid after passing through the flow path.

In this structure, the liquid discharge head is operated while an end of the liquid introduction tube, connected to the flow path with the other end, is brought in contact with liquid such as a sample solution, so that the solution is sent to the flow path via the liquid introduction tube and finally discharged from the liquid discharge head. As the amount of solution discharged from the liquid discharge head at a time is several dozen picoliters, a solution can be sent at the speed necessary for microfluidic systems by driving frequency at, for example, 2-10 kHz. The sample solution transfer speed can be controlled by controlling the discharge speed. Moreover, with this structure, bubbles cannot easily enter the connecting part because capillaries are not used much for connection. Furthermore, because the sample solution and the flow path in the microfluidic chip are mutually connected only by the liquid introduction tube, the dead volume is small. The entire microfluidic system becomes compact, as capillaries are not used. A plurality of flow paths can also be provided to a microfluidic system to make several reactions occur at the same time.

The microfluidic chip can ideally be detached from the liquid introduction tube and the liquid discharge head. With that kind of structure, the microfluidic chip can be disposable, and therefore is suitable for use in analysis of a low-concentration biological sample that is likely to be affected by contamination.

The plate is preferably made of transparent material. With that kind of structure, a reaction occurring in the flow path can easily be detected externally with luminescence or fluorescence.

The liquid introduction tube and liquid discharge head are ideally connected to the flow path on the same principal surface of the plate-shaped microfluidic chip. With that kind of structure, no projections are made on another principal surface where the liquid introduction tube and the liquid discharge head are not provided, and therefore, luminescence or fluorescence in the flow path can easily be detected from another surface.

The above-described microfluidic system structure is realized by making the microfluidic chip by layering and bonding two plates, one of which has a groove used as a flow path in the surface; forming through holes in either of those two plates respectively at positions corresponding to both ends of the flow path; making one of the through holes directly or indirectly communicate with the liquid introduction tube; and making another through hole directly or indirectly communicate with the liquid discharge head. "Directly communicating" means that the liquid introduction tube or the liquid discharge head is directly connected to the through hole, and"indirectly communicating" means that connection is made via sealing material or a flow path, etc.

The flow path preferably has a dam section having a narrower flow path diameter than other parts of the flow path. With that structure, the beads of a size unable to pass through the dam section having the probe immobilized on their surface can be accumulated at that position by transferring a solution containing those beads to the flow path. Accordingly, the sample density at the location of the dam section can be increased.

The present invention also provides a sample analysis device equipped, when used, with a plate-shaped microfluidic chip having a flow path, including fixing means having a liquid introduction tube capable of, when the sample analysis device is equipped with the microfluidic chip, communicating with one end of the flow path, and a liquid discharge head capable of, when the sample analysis device is equipped with the microfluidic chip, communicating with the other end of the flow path, the fixing means capable of integrally fixing the microfluidic chip, the liquid introduction tube, and the liquid discharge head.

With that device, a sample can be efficiently analyzed by attaching a disposable microfluidic chip to the device.

The sample analysis device preferably includes an optical detection system capable of detecting any reaction occurring in the flow path. With that structure, a reaction occurring in the microfluidic chip can be detected in real time.

Also, the sample analysis device preferably includes an sucking means capable of sucking gas or liquid in the liquid discharge head via a nozzle in the liquid discharge head. With that structure, when starting to use the device, the liquid discharge head can be filled with the liquid to the tip by activating the sucking means while soaking the liquid introduction tube in the liquid. If the liquid discharge head is blocked, the blockage can be removed by sucking the blockage with the sucking means.

The present invention also provides a microfluidic chip attached to the sample analysis device when used. The microfluidic chip according to an aspect of the present invention is a plate-shaped microfluidic chip having a flow path, and can be directly or indirectly connected to the liquid introduction tube and the liquid discharge head and make a sample solution react in the flow path when attached to the sample analysis device.

The microfluidic chip is ideally made of transparent material in order to detect a reaction in the flow path. By using inexpensive transparent material such as glass or transparent resin, the microfluidic chip can be made disposable. Also, the microfluidic chip can be used for analysis using a low-concentration biological sample while avoiding contamination.

The microfluidic chip according to an aspect of the present invention is preferably formed by layering and bonding two plates, at least one of which has a groove used as the flow path in its surface, and either of which has through holes respectively at positions corresponding to both ends of the flow path.

The flow path preferably includes a dam section having a narrower flow path diameter than other parts of the flow path.

The present invention also provides a method for detecting or measuring a target substance in a sample solution by using a microfluidic system having a dam section. This method includes soaking an end of a liquid introduction tube opposite the end connected to the flow path in a solution—the solution containing beads a substance having affinity for the target substance has been attached to, and the beads being of the size unable to pass through the dam section—then activating a liquid discharge head, introducing the solution containing the beads into the flow path in the microfluidic chip, and damming the beads at the dam section, soaking an end of the liquid introduction tube opposite the end connected to the flow path in the sample solution, bringing the liquid discharge head in sufficient contact with the beads dammed at the dam section by activating the liquid discharge head and introducing the sample solution into the flow path in the microfluidic chip, and detecting or measuring the binding between the target substance and the substance having affinity for the target substance immobilized to the bead surface.

With that configuration, as the beads are dammed at the dam section, the substance having affinity for the target substance immobilized to the bead surface is concentrated in front of the dam section. Subsequently, by introducing the sample solution that possibly contains the target substance to the flow path, the substance immobilized to the beads reacts with the target substance and the target substance is captured on the bead surface. The existence/amount of the target substance in the sample solution can be measured by detecting or measuring that binding. As the beads stop at the dam section, the above detection can easily be performed.

Soaking the end of the liquid introduction tube opposite the end connected to the flow path in a cleaning liquid and then activating the liquid discharge head is also ideally included after bringing the sample solution in contact with the beads and before detecting or measuring binding. With that configuration, false-positive reaction due to nonspecific adsorption can be removed.

Soaking the end of the liquid introduction tube opposite the end connected to the flow path in a solution containing a labelled substance having affinity for the target substance and activating the liquid discharge head and binding the labeled substance with the target substance are ideally also included after bringing the sample solution in contact with the beads and before detecting or measuring binding. With that configuration, detection of the existence of the target substance becomes easy.

In the target substance detection/measurement method according to an aspect of the present invention, the liquid discharge head is preferably operated to sequentially discharge droplets at 2-10 kHz. With that configuration, the solution can be sent to the flow path in the microfluidic chip at an almost fixed speed, and not in a pulsed manner.

DESCRIPTION OF PREFERRED EMBODIMENTS

Preferred embodiments of the present invention will be described below with reference to the drawings.

Microfluidic System and Microfluidic Chip

Figure 1:
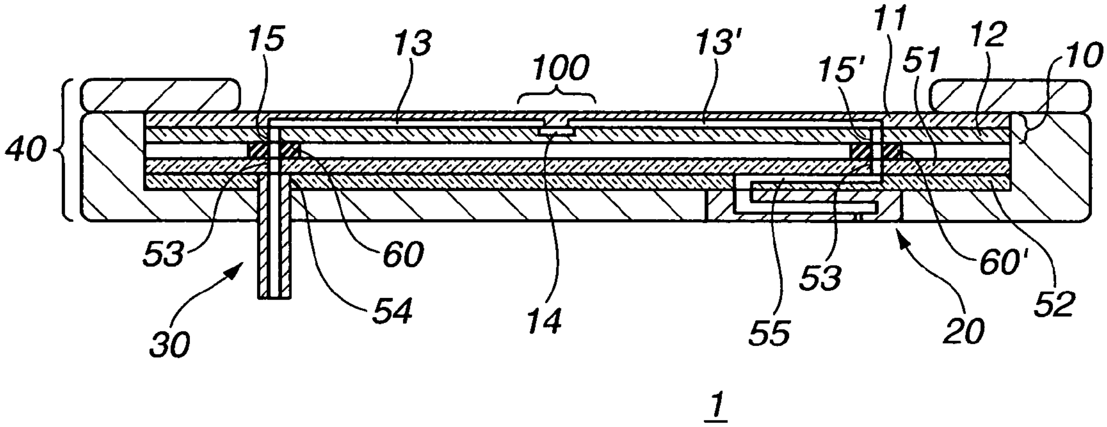
FIG. 1 is a schematic cross sectional view of a microfluidic system according to an aspect of the present invention.

FIG. 1 shows the schematic cross sectional view of a microfluidic system 1 according to an aspect of the present invention.

The microfluidic system 1 includes a plate-shaped microfluidic chip 10 having continuous flow paths 13, 14, and 13', a cylindrical liquid introduction tube 30 connected to an end of the flow path 13 for supplying liquid to the flow paths 13, 14, and 13', and a liquid discharge head 20 connected to an end of the flow path 13' for discharging the liquid that has passed through the flow paths 13, 14, and 13'.

The microfluidic system 1 is held by a holder 40, to which the plates 51 and 52 having the flow paths are fixed. The liquid discharge head 20 and the liquid introduction tube 30 are also fixed to the holder 40.

The microfluidic chip 10 includes two plates 11 and 12, each having a groove used as a flow path. In the plate 12 through holes 15 and 15' are provided respectively at positions corresponding to both ends of the flow path. The through hole 15 communicates with the through hole provided in the plate 51 via an O-ring 60 used as sealing material, and with the liquid introduction tube 30. Meanwhile, the through hole 15' communicates with the through hole provided in the plate 51 via an O-ring 60' used as sealing material, and is connected to the liquid discharge head 20 via the flow path provided in the plate 52.

Figure 2A:
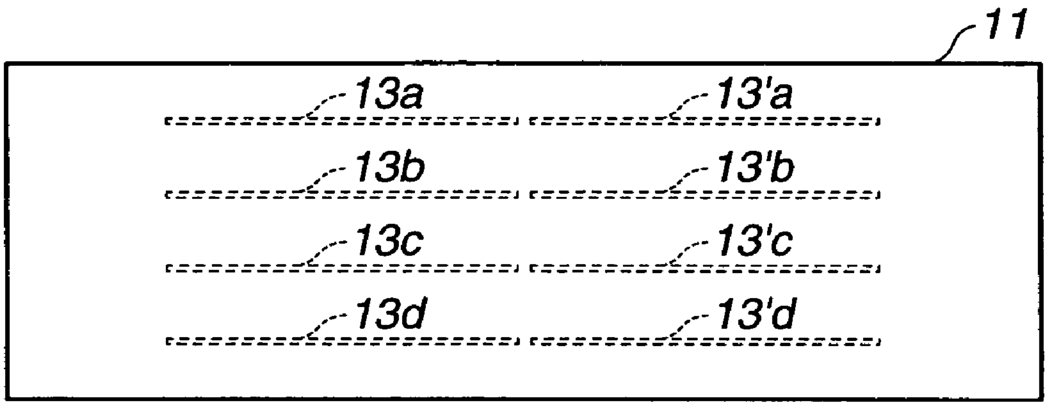
FIGS. 2A and 2B are plan views of plates forming a microfluidic chip according to an aspect of the present invention.

FIG. 2 are plan views of the plates 11 and 12 forming the microfluidic chip 10. FIG. 2A is a plan view of the plate 11. Grooves 13*a*-13*d* and 13'*a*-13'*d* used as flow paths are formed in a surface of the plate 11 having contact with the plate 12. A small gap is provided between the respective grooves 13*a*-13*d* and 13'*a*-13'*d*.

Figure 2B:
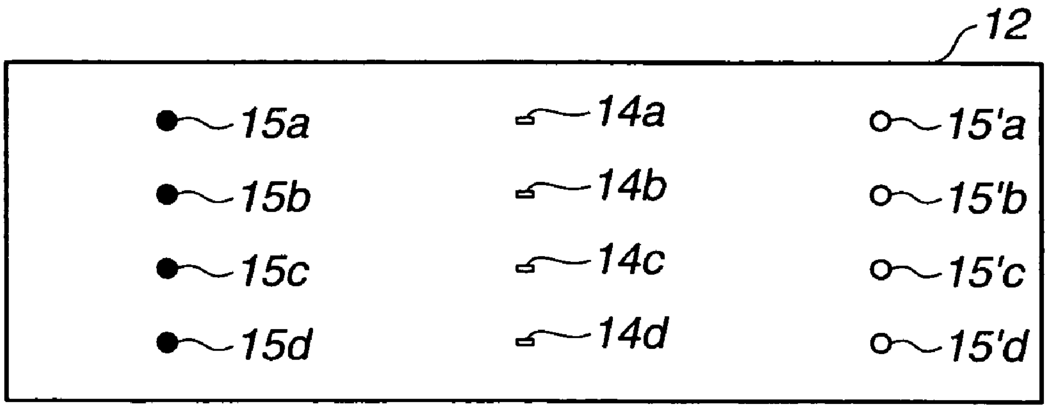

FIG. 2B is a plan view of the plate 12. Grooves 14*a*-14*d* used as flow paths are formed on the surface of the plate 12 having contact with the plate 11. The grooves 13*a*-13*d* are made to communicate respectively with the grooves 13'*a*-13'*d* via the grooves 14*a*-14*d* by bonding the plates 11 and 12. Through holes 15*a*-15*d* and 15'*a*-15'*d* are formed respectively at both ends of the plate 12, and are made to communicate respectively with the grooves 13*a*-13*d* and 13'*a*-13'*d* by layering and bonding the plates 11 and 12.

Although there are no limits on the material that can be used for the plates 11 and 12, reactions such as luminescence in the flow paths can easily be detected if a glass plate or transparent resin plate is used. The groove depth can be changed arbitrarily according to the intended use. For example, the depth of the grooves 13*a*-13*d* and 13'*a*-13'*d* may be set to about 100 μm, and the depth of the grooves 14*a*-14*d*, which are the dam sections, can be set to about 20 μm. The grooves and the through holes may be formed respectively by, e.g., an etching method or shot blast method.

The microfluidic chip 10 is formed by piling up and bonding the plates 11 and 12. A bonding method for the plates may be selected depending on the material of the plates. If glass plates are used, the thermal bonding method can be used.

Figure 3:
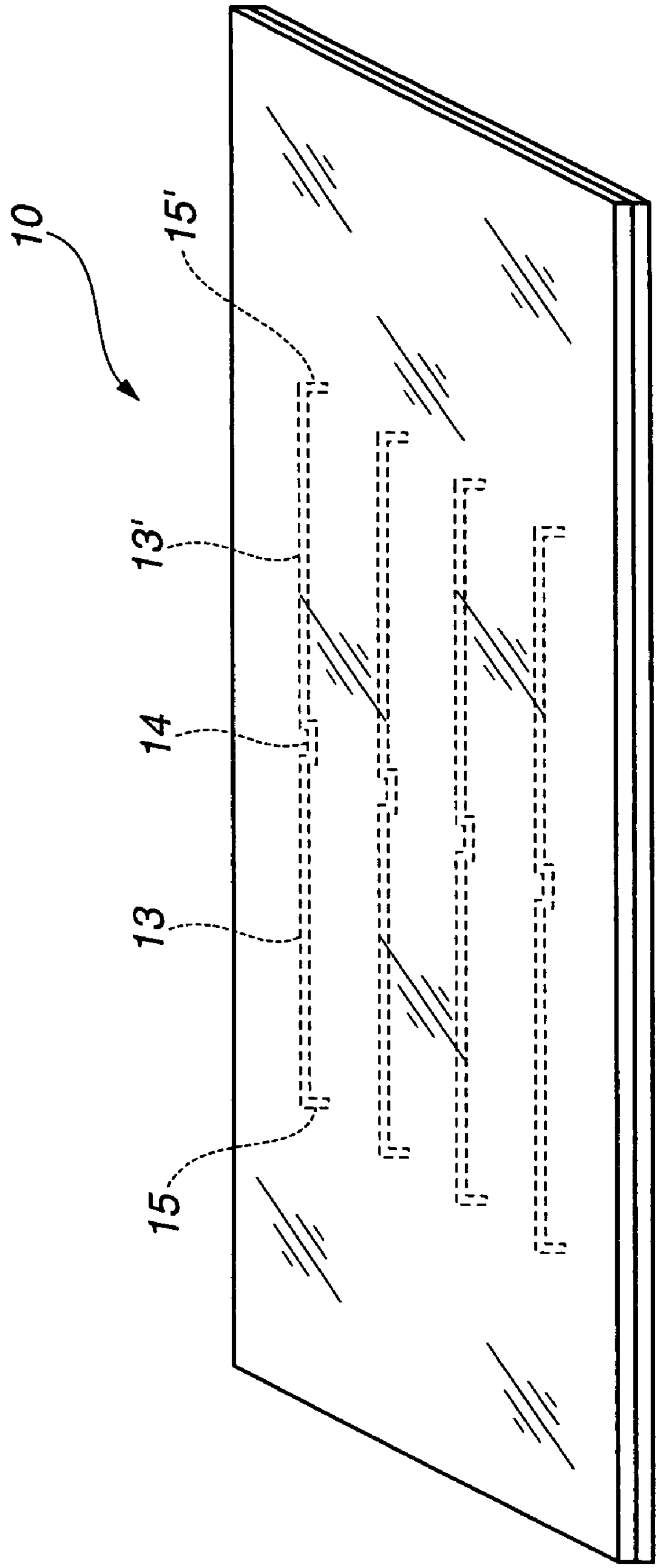
FIG. 3 is a schematic perspective view of a microfluidic chip according to an aspect of the present invention.

FIG. 3 is a schematic perspective view of the microfluidic chip 10 manufactured in the above described manner. In this embodiment, liquid such as a sample solution can be sent separately via four paths and made to react. The number of flow paths may be changed arbitrarily. As described above, the microfluidic chip 10 has a simple structure, and can be made disposable by using inexpensive material.

Figure 4A:
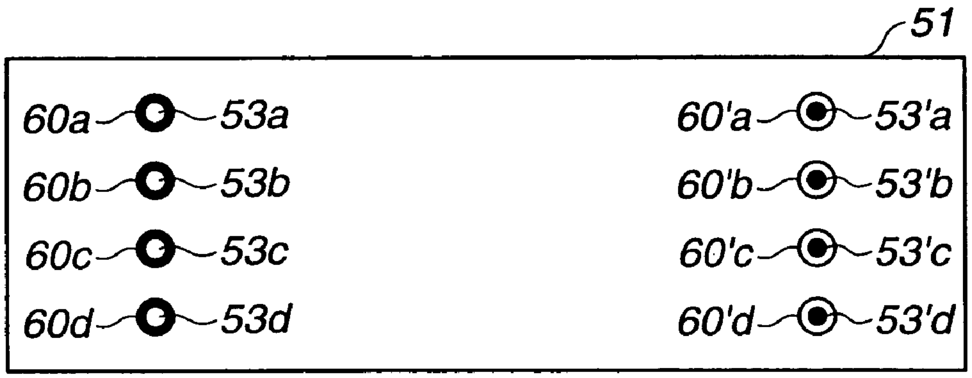
FIGS. 4A and 4B are plan views of plates forming a microfluidic system according to an aspect of the present invention.

Next, the structure of the plates 51 and 52 fixed to the microfluidic system 1 will be described with reference to FIGS. 4A and 4B. First, FIG. 4A is a plan view of the plate 51. In the plate 51, through holes 53*a*-53*d* and 53'*a*-53'*d* are formed respectively at positions corresponding to the through holes provided in the plate 12. O-rings 60*a*-60*d* and 60'*a*-60'*d* are provided on a surface of the plate 51 to respectively surround those through holes. With that structure, even when the microfluidic chip 10 is made detachable, the through holes 15*a*-15*d* and 15'*a*-15'*d* can be connected respectively with through holes 53*a*-53*d* and 53'*a*-53'*d* so as not to leak a solution, by layering the microfluidic chip 10 with the plate 51 via the O-rings and fixing the plates with the holder 40 (see FIG. 1).

Figure 4B:
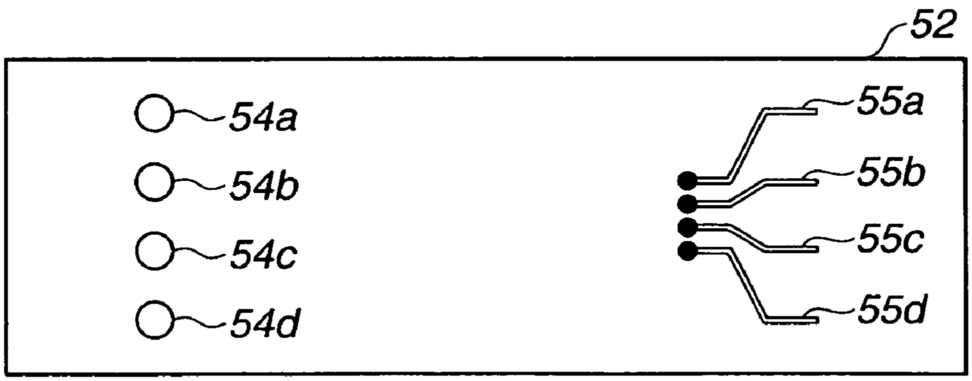

FIG. 4B shows a plan view of the plate 52. The plate 52 has through holes 54*a*-54*d*, which have the same diameter as the outer diameter of the liquid introduction tube 30, and grooves 55*a*-55*d*. One end of each groove 55*a*-55*d* is connected respectively to the through hole 53'*a*-53'*d* in the plate 51, and the other end has a through hole connected to the liquid discharge head 20.

There are also no particular limits on the material that can be used for the plates 51 and 52. For example, glass plates can be used. In that case, the plates can be bonded with a thermal bonding method.

Figure 5:
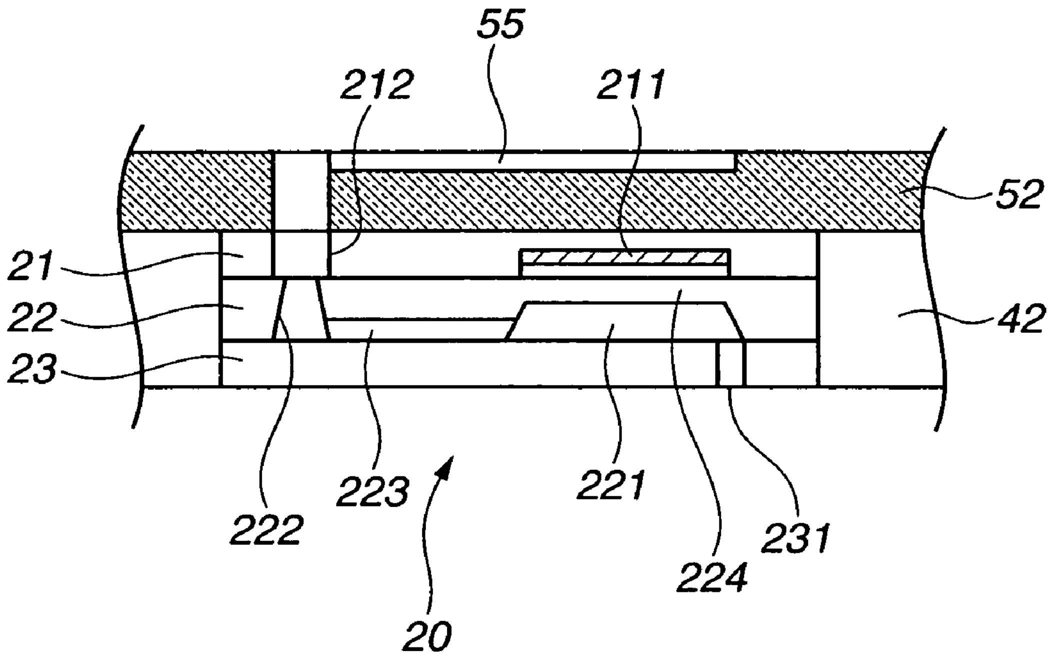
FIG. 5 is an enlarged cross sectional view of a liquid discharge head.

FIG. 5 shows an enlarged cross sectional view of an electrostatically-driven liquid discharge head 20, as an example of a liquid discharge head used in the microfluidic system according to an aspect of the present invention. Although the driving method for the liquid discharge head may be selected arbitrarily from well known methods, the piezoelectric driving method or electrostatic driving method with which heat is not generated is preferably used when using a biological sample.

The liquid discharge head 20 has a configuration in which a pressure applying means in a pressure application chamber can be independently actuated to discharge droplets from a nozzle hole just by connecting the liquid discharge head 20 to a power source. A head chip 20 includes an electrode plate 21 having electrodes 211, a pressure application chamber plate 22 having pressure application chambers 221, and a nozzle plate 23 having nozzle holes 231. The number of through holes 212 formed in the electrode plate 21, through holes 222, flow paths 223, and pressure application chambers 221 formed in the pressure application chamber plate 22, and nozzles 231 is the same as the number of flow paths in the microfluidic chip 10 (four in this embodiment), and those members correspond respectively to each other. Each electrode 211 corresponds to each pressure application chamber 221, and pressure can be applied separately to each pressure application chamber 221.

The through holes 212 formed in the electrode plate 21 are connected to the through holes in the plate 52. When voltage is applied between a common electrode (not shown) and the electrode 211, pressure is applied to liquid, introduced into the pressure application chambers 221 via those through holes, due to resilience displacement in a vibrating plate 224, and the liquid is discharged from the nozzle hole 231. The electrode plate 21 has a groove in the lower surface shown in the figure, and an electrode 211 is provided at the ceiling of the groove. Therefore, a small air gap is formed between the electrode 211 and the vibrating plate 224. Although there are no particular limitations on the material used for the electrode plate 21, pressure application chamber plate 22, and nozzle plate 23, material such as glass or silicone is suitable if the liquid that is to be discharged contains a biological sample.

The microfluidic system 1 is assembled by inserting the liquid introduction tube 30 to the through holes 54*a*-54*d* in the plate 52, fixing the liquid discharge head 20 to the plate 52 so that the liquid discharge head 20 communicates with the through holes provided respectively at an end of the grooves 55*a*-55*d*, layering the microfluidic chip 10 with the plates 51 and 52 via the O-rings, and appropriately holding the microfluidic chip 10 with the holder 40. There are no particular limitations on the material used for the liquid introduction tube 30, but metal, resin, or glass, etc. may be used. For example, a glass capillary tube fixed to glass plates with epoxy adhesive may be used as the liquid introduction tube. If a polystyrene capillary is used as the liquid introduction tube 30, the inner wall surface is preferably subjected in advance to treatment to have hydrophilic properties. A sealing member may be provided at insertion parts so that the liquid introduction tube 30 can be replaced.

Sample Analysis Device

Figure 6:
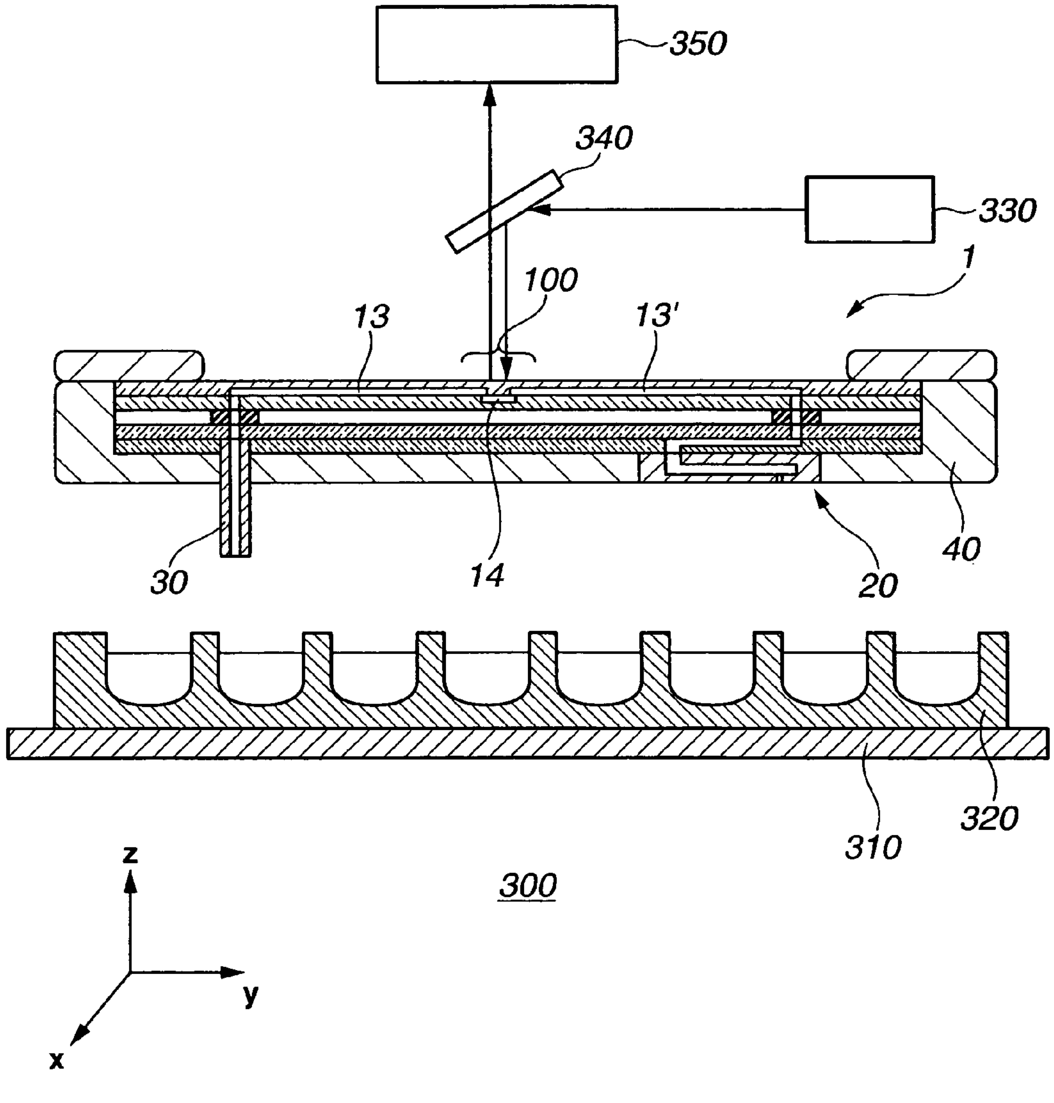
FIG. 6 is a schematic view showing the configuration of a microfluidic system according to an aspect of the present invention.

FIG. 6 shows an example of a schematic configuration of a sample analysis device 300 using the above described microfluidic system according to an aspect of the present invention. As shown in FIG. 6, the sample analysis device 300 includes the microfluidic system 1, the holder 40 for fixing the microfluidic system 1, a liquid container 320 for containing a sample solution or buffer solution, etc., a table 310 the liquid container 320 is placed on, an excitation light generator 330 for supplying excitation light if reaction in the flow paths is detected with fluorescent dye, and a CCD camera 350 for detecting the fluorescence.

The light generated by the excitation light generator is reflected by a mirror 340 and radiated on to the flow paths, and the fluorescence excited in the flow paths is detected by the CCD camera 350.

The table 310 can be freely moved in any of the X, Y, and Z directions shown with arrows in FIG. 6. By moving the liquid container 320, the sample analysis device 300 is adjusted so that the liquid introduction tube 30 in the microfluidic system soaks in a solution in a well in the liquid container 320, or liquid is discharged from the liquid discharge head 20 to a well in the liquid container 320.

Figure 7A:
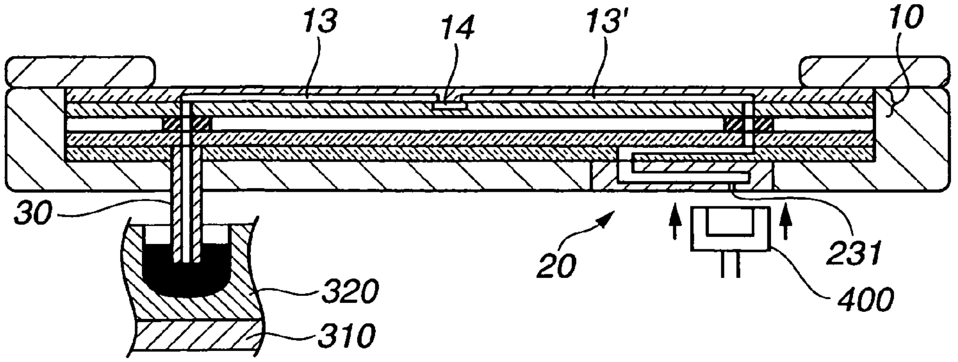
FIGS. 7A-7C are views illustrating how to use a microfluidic system according to an aspect of the present invention.

A liquid introduction method will be described with reference to FIGS. 7A-7C. First, as shown in FIG. 7A, the position of the table 310 is controlled so that the tip of the liquid introduction tube 30 soaks in liquid in the liquid container 320. Next, an sucking means 400 having a cap means that covers a nozzle hole 231 in the liquid discharge head 20 and is attached to the nozzle face is firmly attached to the nozzle face by moving the sucking means 400 in the direction indicated with arrows.

Figure 7B:
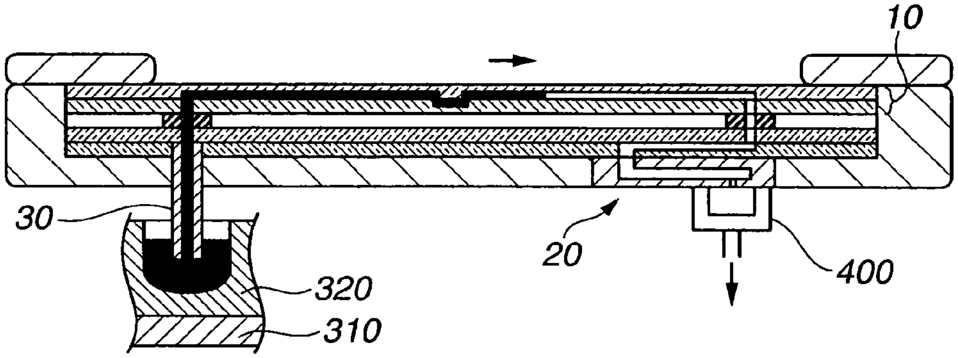
Figure 7C:
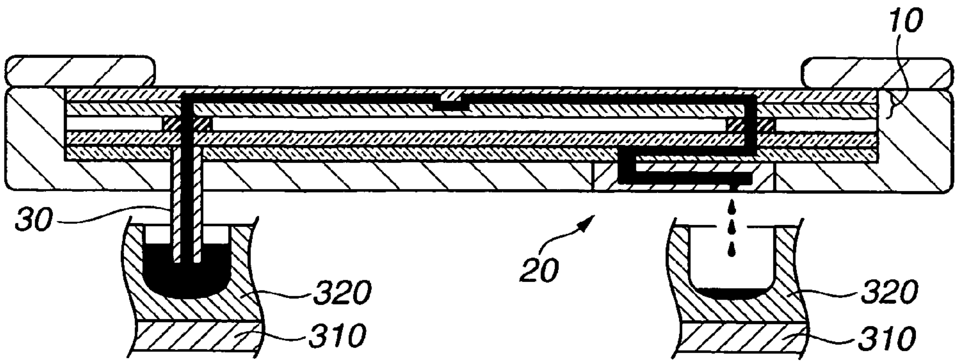

Next, as shown in FIG. 7B, the sucking means 400 is activated so that liquid in the liquid container 320 is sucked from the nozzle hole 231 and introduced into the flow paths 13, 14, and 13' in the microfluidic chip 10 via the liquid introduction tube 30. Absorption is stopped when the liquid reaches the nozzle hole 231 in the liquid discharge head 20, and the sucking means 400 is then removed from the nozzle face. Subsequently, the liquid discharge head 20 is activated to discharge droplets, and the liquid thus goes through the overall flow paths.

Generally, the flow speed of about 1-2 μL/minute is necessary in microfluidic systems. Meanwhile, as the amount of droplets discharged at a time from the liquid discharge head 20 is several dozen picoliters, liquid can be sent at the necessary flow speed by repeating discharge at, e.g., 2-10 kHz. If discharge is repeated at that speed, pulsed discharge can be avoided and liquid can be sent at a substantially fixed speed.

Target Substance Detection/Measurement Method

Next, a method for detecting or measuring a target substance according to an aspect of the present invention will be described. In this embodiment, a possible target substance that is contained in a sample solution is detected by using an antibody that reacts with the target substance.

First, the microfluidic chip 10 is fixed to the holder 40 (see FIG. 1). The table 310 is moved in the manner shown in FIG. 7 to soak the liquid introduction tube 30 in liquid that does not affect subsequent measurement, such as purified water or buffer solution prepared in the liquid container 320. After that, the liquid is taken in by the sucking means 400 up to the nozzle hole 231 in the liquid discharge head 20.

Figure 8A:
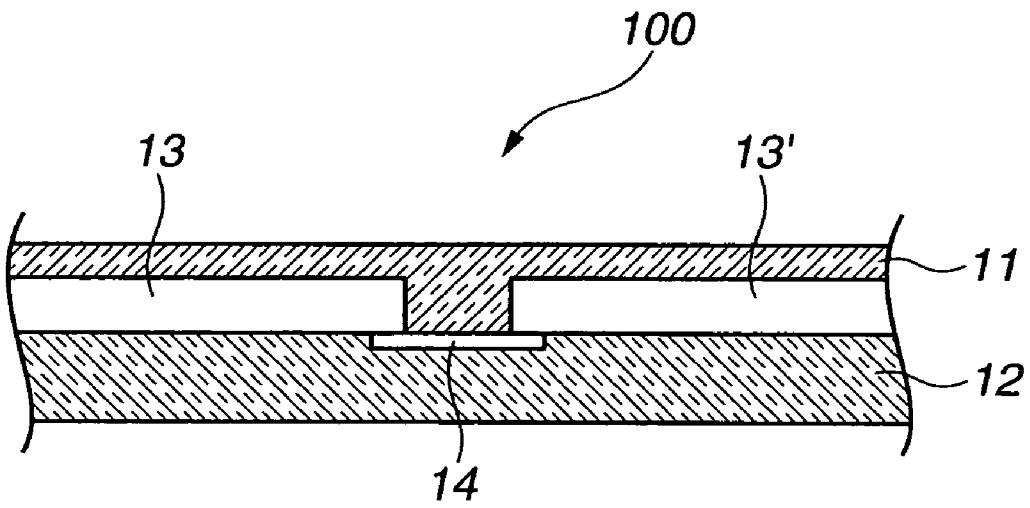
FIGS. 8A and 8B are enlarged cross sectional views of a dam section in a microfluidic chip.
Figure 8B:
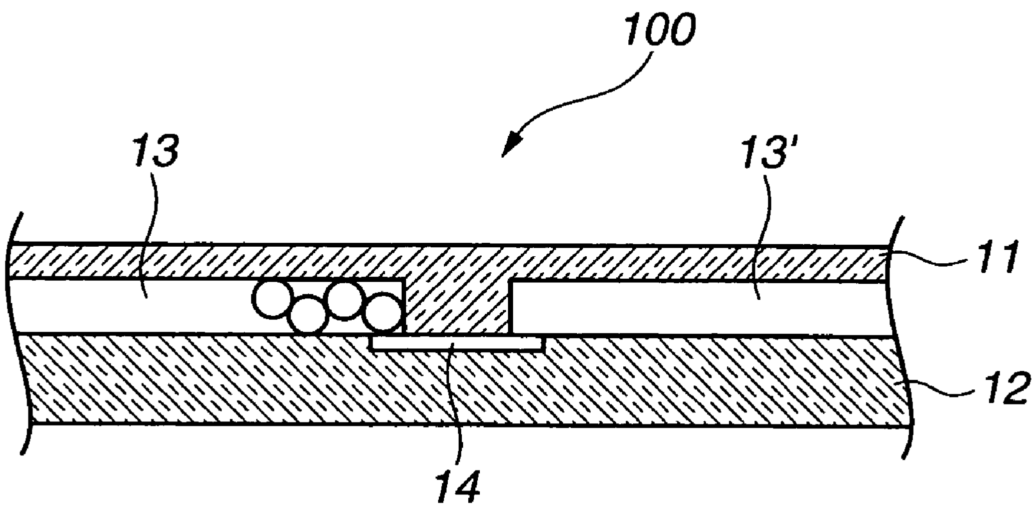

Subsequently, a solution containing beads having an antibody that reacts with the target substance immobilized to its surface is prepared in the liquid container 320, and the table 310 is moved again so that the tip of the liquid introduction tube 30 is made to soak in the solution. By activating the liquid discharge head 20 and repeating solution discharge in that state, the liquid is introduced from the liquid introduction tube 30 to the flow path 13 and sent to the flow paths 14 and 13'. Meanwhile, the beads cannot pass through the dam section 100 and remain in the flow path 13 in front of the dam section 100. FIG. 8A shows an enlarged cross-sectional view of the dam section 100, and FIG. 8B shows the state of the dammed beads. The beads the antibody has been immobilized to can be prepared according to a well-known method. If, as described above, the width of the flow paths 13 and 13' is about 100 μm and the width of the flow path 14 at the dam section is about 20 μm, beads each having a diameter of about 40 μm may be used.

Next, a sample solution that possibly contains the target substance is prepared in the liquid container 320, and the table 310 is moved so that the liquid introduction tube 30 soaks in the sample solution. By activating the liquid discharge head 20 and repeating solution discharge in that state, the solution is introduced from the liquid introduction tube 30 to the flow path 13, and binds with the antibody on the bead surface if the target substance exists.

Then the table 310 is moved again so that the liquid introduction tube 30 soaks in water or buffer solution prepared in the liquid container 320, and the liquid discharge head 20 is activated to clean the flow paths. Nonspecifically adsorbed substances are washed out through this process, and only the target substance specifically binding with the antibody can be captured on the bead surface.

Next, a fluorescent substance is attached to a secondary antibody having affinity for the target substance, dissolved in the solution, and prepared in the liquid container 320. After that, the table 310 is moved so that the liquid introduction tube 30 is made to soak in the solution, and the liquid discharge head 20 is activated. In that way, the secondary antibody is bound with the target substance captured by the antibody on the bead surface. If necessary, a nonspecifically adsorbed substance can be removed by transferring water or a buffer solution to the flow paths to clean the paths.

Subsequently, excitation light is generated by the excitation light generator 330 shown in FIG. 6 and radiated in the vicinity of the dam section 100 via the mirror 340. By detecting the fluorescence excited above with the CCD camera 350, the existence/amount of the target substance can be measured.

As described above, with the target substance detection/measurement method using the microfluidic system according to an aspect of the present invention, several reactions can be quickly made to occur at the same time by preparing the necessary solutions in, for example, a microtiter plate and sequentially moving the table 310. Because capillaries are not used for connection between the liquid container and the flow paths, the dead volume becomes small and waste of used solutions or test reagent can be controlled. Moreover, the solution flow speed can be freely changed by changing the frequency of discharge from the liquid discharge head. Accordingly, a solution can be sent at different flow speeds in each flow path. Furthermore, because the microfluidic chip can have a detachable structure, it can be made disposable, or can be detached for cleaning. In measurement using a low-concentration biological solution, detection can be performed with good sensitivity and accuracy, avoiding contamination.

The present invention is not limited to the content of the above described embodiments, and various modifications can be made within the scope of the gist of the present invention. For example, beads an antibody has been immobilized to are used in the above described target substance detection method. However, according to an aspect of the invention, not only the antigen-antibody reaction but also various other types of reaction, such as hybridization between nucleic acids, enzyme-substrate reactions, and reactions between various receptors and ligands can be detected by using a substance having affinity for a target substance. Moreover, not only the fluorescent substance but also color change or reaction occurring due to various reactions can be detected.

The detection system for the sample analysis device according to an aspect of the present invention can also be changed arbitrarily depending on the reaction detected.

Although the microfluidic system is fixed, and the table the liquid container is placed on is moved in the sample analysis device in the above described embodiment, the reverse is also possible.

What is claimed is:

1. A method for detecting or measuring a target substance in a sample solution by using a microfluidic system including:

a plate-shaped microfluidic chip having a flow path;

a liquid introduction tube for supplying liquid to the flow path, the liquid introduction tube having an end communicating with an end of the flow path and its other end that can be soaked in the liquid that is to be supplied to the flow path; and a liquid discharge head communicating with the other end of the flow path for discharging liquid that has passed through the flow path, wherein the flow path has a dam section having a narrower flow path diameter than other parts of the flow path, the method comprising:

soaking an end of the liquid introduction tube opposite the end connected to the flow path in a solution containing beads each having a size preventing the beads passing through the dam section, with a substance having affinity for the target substance being immobilized to the surface of the beads, activating the liquid discharge head, introducing the solution containing the beads into the flow path in the microfluidic chip, and damming the beads at the dam section;

soaking an end of the liquid introduction tube opposite the end connected to the flow path in the sample solution;

activating the liquid discharge head and introducing the sample solution into the flow path in the microfluidic chip to bring the sample solution in sufficient contact with the beads dammed at the dam section; and detecting or measuring binding between the target substance and the substance having affinity for the target substance that has been immobilized to the bead surface.

2. The target substance detection/measurement method according to claim 1, further comprising, after bringing the sample solution in contact with the beads and before detecting or measuring binding, soaking the end of the liquid introduction tube opposite the end connected to the flow path in cleaning liquid and activating the liquid discharge head.

3. The target substance detection/measurement method according to claim 1, further comprising, after bringing the sample solution in contact with the beads and before detecting or measuring binding, soaking an end of the liquid introduction tube opposite the end connected to the flow path in a solution containing a labelled substance having affinity for the target substance, activating the liquid discharge head, and binding the target substance with the labelled substance.

4. The target substance detection/measurement method according to claim 1, wherein the liquid discharge head is operated to sequentially discharge droplets at 2-10 kHz.

* * * * *